Figure 1:
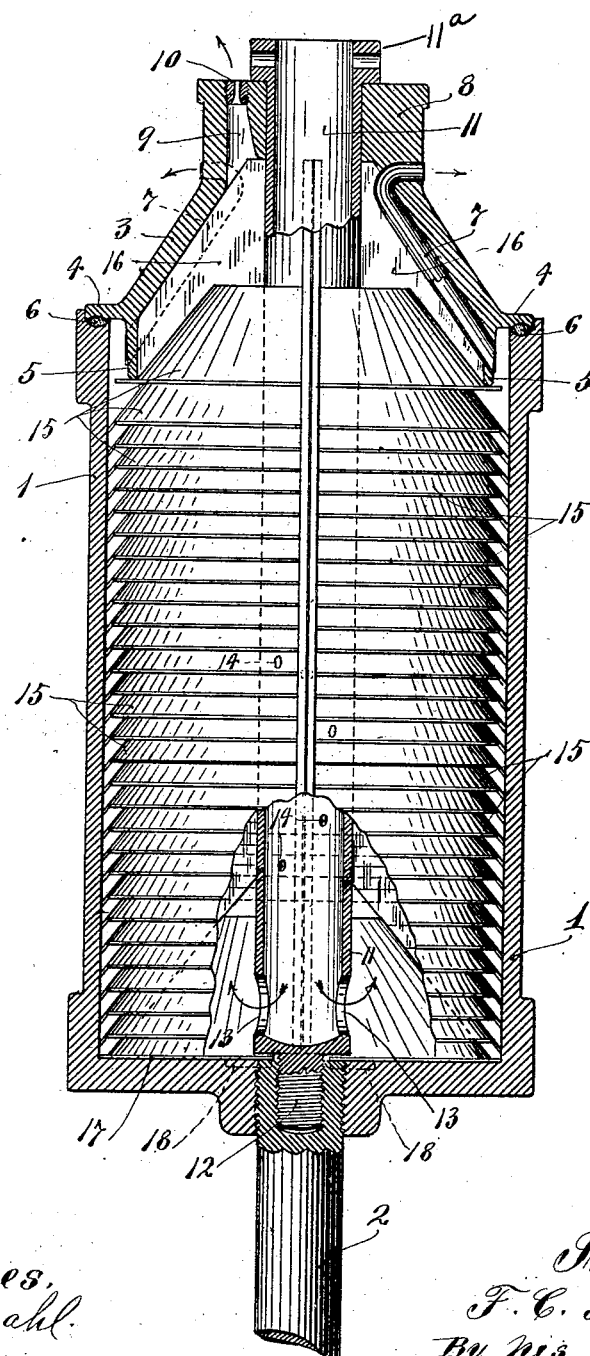

No. 854,519. PATENTED MAY 21, 1907.
F. C. McMULLEN.
CREAM SEPARATOR BOWL.
APPLICATION FILED SEPT. 17, 1904.

2 SHEETS—SHEET 1.

Witnesses,
A. H. Opsahl.
E. W. Jeppesen.

Inventor.
F. C. McMullen
By his Attorneys
Williamson & Merchant

No. 854,519. PATENTED MAY 21, 1907.
F. C. McMULLEN.
CREAM SEPARATOR BOWL.
APPLICATION FILED SEPT. 17, 1904.
2 SHEETS—SHEET 2.
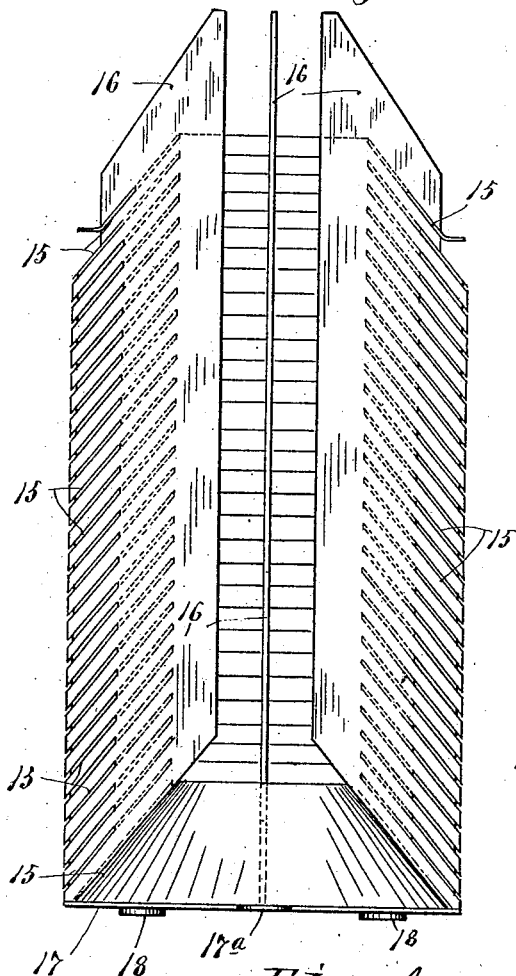
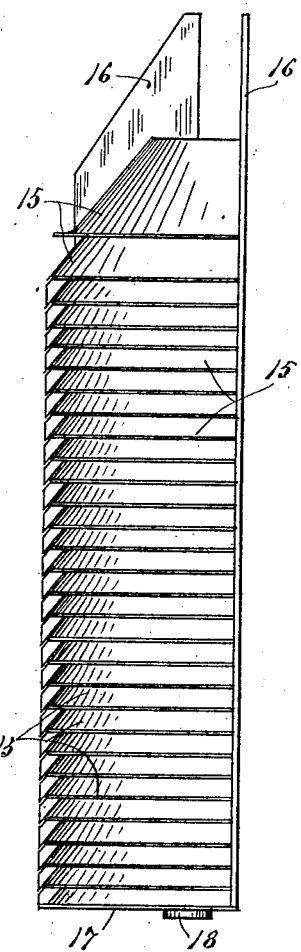
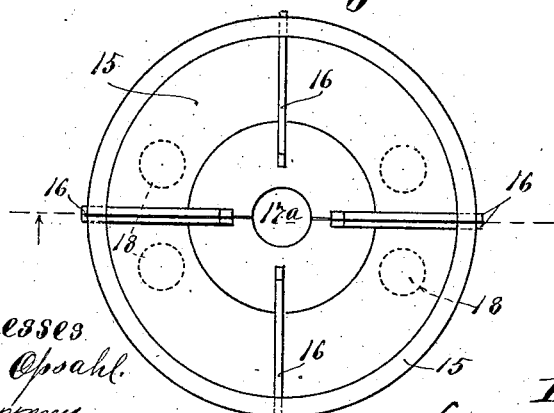
Witnesses
A. H. Opsahl.
G. W. Jeppesen.
Inventor.
F. C. McMullen.
By his Attorneys.
Williamson & Merchant

UNITED STATES PATENT OFFICE.

FRANK C. McMULLEN, OF MINNEAPOLIS, MINNESOTA, ASSIGNOR TO CLEMENT W. HOOVEN, OF ANDERSON, INDIANA.

CREAM-SEPARATOR BOWL.

No. 854,519.  Specification of Letters Patent.  Patented May 21, 1907.

Application filed September 17, 1904. Serial No. 224,780.

*To all whom it may concern:*

Be it known that I, FRANK C. McMULLEN, a citizen of the United States, residing at Minneapolis, in the county of Hennepin and State of Minnesota, have invented certain new and useful Improvements in Cream-Separator Bowls; and I do hereby declare the following to be a full, clear, and exact description of the invention, such as will enable others skilled in the art to which it appertains to make and use the same.

My present invention relates to cream separators, and has for its object to improve the internal mechanism of the separating bowl in the several particulars hereinafter noted.

The invention consists of the novel devices and combinations of devices hereinafter described and defined in the claims.

In the accompanying drawings which illustrate my invention, like characters indicate like parts throughout the several views.

Figure 1 shows the separator bowl in central vertical section, and shows the internal mechanism of the bowl partly in section and partly in full side elevation, some parts being broken away. Fig. 2 is a detail in elevation, showing one section of the divided bowl "liner". Fig. 3 is an elevation of the liner section shown in Fig. 2 viewed at ninety degrees from the position in which it is viewed in Fig. 2; and Fig. 4 is a plan view of the complete liner, showing the two sections thereof placed together.

The numeral 1 indicates the bowl which, as is usual, is rigidly secured at its lower end to the upper end of a driving spindle 2, and is provided at its upper end with an approximately conical cover 3, having an out-turned flange 4, and a depending flange 5. The flange 4 overlies the upper edge of the bowl 1, and between the same, and the said bowl, is interposed a gasket or annular packing 6. The flange 5 depends within the bowl, and is perforated at several points, to afford seats, skim milk outlet tubes 7. The cover 3 at its upper end, is formed with a sleeve passage 8. In the top of the cover 3, eccentric to the passage 8, is a cream outlet passage 9 which, as shown, has interposed in its upper extremity, a small bushing 10, which affords a restricted outlet for the cream.

Extending through the passage 8 of the cover 3, and depending axially entirely through the bowl 1, is a milk supply tube 11. At its extreme lower end, this tube 11 is provided with a threaded trunnion 12 which fits a threaded seat formed in the upper end of the spindle 2. Close to its extreme lower end, the tube 11 is formed with a plurality of main discharge orifices 13, and throughout its intermediate portion, it is formed with a plurality of relatively small supplemental discharge orifices 14, which orifices 14 open therethrough at various points circumferentially and longitudinally thereof. The milk supplied through the tube 11 passes out from said tube into said bowl chiefly through the main discharge orifices 13, but in part through the supplemental discharge orifice 14.

The bowl liner, which is of novel construction, and constitutes the principal feature of my invention, is constructed in sections, that is, is divided longitudinally, preferably into two parts, and is made up of semi-annular concavo-convex disks 15, and radial, longitudinally extended, partition plates 16. The upper ends of the partition plates 16 are outwardly beveled to fit the interior of the cover 3, while the lower ends of said plates are inwardly beveled to form an uninterrupted annular chamber at the bottom of the liner. Flat, semi-circular, disk sections 17 are rigidly secured to the extreme lower ends of the partition plates 16, and to the extreme lower edges of the lowermost disks 15.

The partition plates 16 extend radially from the supply tube 11 to the cylindrical inner surface of the bowl, but the disks 15, at their outer edges, terminate slightly inward of the inner surface of said bowl, so as to leave an annular passage for the upward flow of the skimmed milk. At their inner edges, said disks 15 terminate considerably short of the supply tube 11, so as to leave a free passage for the upward flow of the cream immediately around the exterior of said tube. The flat bottomed disk formed by the two disk sections 17, is formed with an axial perforation 17$^a$, which is only large enough to freely pass the threaded trunnion 12 of the sleeve 11. The disk sections 17 are further preferably provided with depending bosses 18 which fit into seats formed in the bottom of the bowl.

At its extreme upper end, the supply tube 11 is formed with a head 11$^a$ which engages the upper end of the cover 3 and presses the same tightly down onto the packing 6 under the action of the trunnion 12.

It will be noted that each half or section of the split or divided liner has three partition plates 16, and that two of these lie in the same plane, so that when the two sections of the liner are placed together, the diametrically alined plates of the one section press against and closely engage, flatwise, with the diametrically alined plates of the other section. Of course, a greater number of intermediate partition plates might be employed, and the liner itself may be made in more than two sections.

It will also be understood that other modifications may be made within the scope of my invention as herein set forth and claimed.

Operation:—The milk is introduced into the bowl through the supply tube 11, and will be delivered chiefly at the bottom of the bowl, through the discharge orifices 13. Under the action of centrifugal force, the heavier particles, usually designated as the "skimmed milk", will be thrown outward against the walls of the bowl, just outward of the outer edges of the disks 15, and finds an outlet through the discharge tubes 7. The skimmed milk thus discharged may be caught by the usual means. The cream being relatively light, will be forced to the center of the bowl, and passing upward between the tube 11 and the inner edges of the disks 15, is discharged through the passage 9 of the cover 3, and through the bushing 10. The cream thus discharged may be caught by the usual means.

By means already described, the liner is caused to rotate with the bowl, and the vertical partition plates 16 insure the rotation of the milk and cream with the bowl, and cause the same to rise in several different and distinct columns. Hence it is important to note that the said partition plates, at their inner edges, project inward beyond the inner edges of the disks 15, and into close contact with the supply tube 11, and, at their outer edges, project beyond the outer edges of said disks and into contact with the walls of the bowl, thus cutting off lateral communication between the several columns or vertical passages formed within the bowl by the said partition plates.

The divided or split feature, whereby the liner is formed or made up of several segmental sections, is of the greatest importance, because this permits the said parts to be readily cleaned. The cleaning of devices of this character, wherein a plurality of disks are employed, is, as is well known, of the highest importance, and one hitherto not easily accomplished. With a plurality of disks loosely put together, the cleaning thereof, and putting the parts again together, has been found a very slow and unsatisfactory job. With the disks formed complete, and rigidly connected, the cleaning of the device would be extremely difficult. However, with the liner split longitudinally, or formed in segmental sections, access can be easily had, with a brush or other device, both to the interior and exterior portions thereof. The facts above stated, I have demonstrated by actual usage of the device.

What I claim and desire to secure by Letters Patent of the United States is as follows:

A cream separator including a revoluble bowl having a cover formed with an outlet passage for the skimmed milk and cream, a milk supply tube extending through said cover and axially through said bowl and having at its lower end a milk discharge orifice, and a bowl liner split longitudinally and made up of semi-annular frusto conical disk sections and partition plates and flat supplemental disk sections rigidly united, said conical disk sections terminating short of the walls of the bowl and of said supply tube, said partition plates extending from said supply tube through the spaces between said conical disk sections, and said supplemental disk sections having interlocking engagement with the bottom of the bowl, substantially as shown and described.

In testimony whereof I affix my signature in presence of two witnesses.

FRANK C. McMULLEN.

Witnesses:
ROBERT C. MABEY,
F. D. MERCHANT.